2,907,725

POLYEPOXIDE, PHENOL-ALDEHYDE CONDENSATES, MIXED ESTER COMPOSITIONS

Sylvan O. Greenlee, Racine, Wis., assignor to
S. C. Johnson & Son, Inc., Racine, Wis.

No Drawing. Application November 19, 1956
Serial No. 622,766

11 Claims. (Cl. 260—19)

This invention relates to new products and compositions resulting from the reaction of phenol-aldehyde condensates, polyepoxides, and mixed esters prepared from hydroxyaryl substituted aliphatic acids, modifying organic acids, and polyhydric alcohols, the compositions being valuable in the manufacture of varnishes, molding compositions, adhesives, films, molded articles, etc. According to the present invention, the phenol-aldehyde condensates, polyepoxide materials and mixed esters may be reacted in regulated proportions to produce initial reaction mixtures as well as intermediate and final reaction products.

An object of this invention is the production of compositions containing phenol-aldehyde condensates, polyepoxides, and mixed esters of hydroxyaryl-substituted aliphatic acids, modifying organic acids, and polyhydric alcohols in proportions suitable for reaction to form resins, films, coating compositions, etc.

Another object of this invention is the production of intermediate reaction products from initial reaction mixtures of these phenol-aldehyde condensates, polyepoxides, and mixed esters capable of further reaction on the application of heat to form insoluble, infusible products.

Another object of this invention is the production of initial and intermediate reaction mixtures of the hereinbefore described character which are stable at ordinary temperatures for relatively long periods of time yet which may be converted to polymeric products upon the application of heat.

Still another object of this invention is the production of final reaction products from these initial and intermediate reaction mixtures characterized by such physical properties as hardness, flexibility, and toughness, and such chemical properties as resistance to the chemicals and water. These and other objects and advantages are attained by the present invention, various novel features of which will become more fully apparent from the following description with particular reference to specific examples which are to be considered as illustrative only.

In the preparation of polymeric, infusible, and insoluble compositions for use in protective coating films, molding compositions, adhesives, etc., one of the major problems is to obtain a product which possesses the necessary hardness but which still retains the desired flexibility and toughness. In the plastics field, polyepoxides have been widely used in preparing such polymers although a recognized major problem has continued to be a method of plasticizing the compositions.

In this invention it has been found that the polyepoxides reacted with the herein described mixed esters and aldehyde condensates provide a new series of compositions possessing a number of outstanding properties. By the proper selection of the mixed ester and aldehyde condensate such properties as flexibility, hardness, gloss, water and chemical resistance, and air-drying or heat-converting characteristics can be easily imparted and readily regulated. These characteristics are incorporated into the composition by primary chemical bonding and, therefore, no problem exists of plasticizer migration or loss through volatilization.

In general, the epoxides contemplated for use are compounds containing an average of more than 1 up to about 20 epoxide groups per molecule. Such compounds, free from functional groups other than epoxide and hydroxyl, are reacted with active hydrogen-containing groups, such as the hydroxyl groups supplied by the mixed esters herein contemplated. Typical epoxides which have been found to be operable are resinous polyepoxides, resinous polyepoxide-polyesters, epoxidized natural oils, and simple aliphatic polyepoxides.

The mixed esters contemplated for use are those prepared from polyhydric alcohols, modifying organic acids, and hydroxyaryl-substituted aliphatic acids. Variations can be obtained in the mixed ester through judicious selection of the modifying organic acid and polyhydric alcohol. The phenolaldehyde condensates are the reaction products of a phenol and an aldehyde, the imparted properties obtained being readily varied through the selection of the proper phenol and aldehyde.

The mixed esters generally are conveniently prepared by esterifying polyhydric alcohols with a mixture of a hydroxyaryl-substituted aliphatic acid and a modifying organic acid under conditions whereby the aryl-hydroxyl groups of the hydroxyaryl-substituted aliphatic acid are substantially unreacted. Since these aryl-hydroxyl groups are more acidic in nature than the alcoholic hydroxyl groups of the polyhydric alcohols, the reaction of aryl-hydroxyl groups will be insignificant in those cases where the reaction mixtures contain about equivalent amounts or more of alcoholic hydroxyl groups for each equivalent of carboxyl groups, and generally it was found that excellent products were obtained using such proportions.

The hydroxyaryl-substituted aliphatic acid contemplated for use herein should have two hydroxyaryl groups attached to a single carbon atom. The preparation of such an acid is most conveniently carried out by condensing a keto-acid with the desired phenol. Experience in the preparation of bisphenol and related compounds indicates that the carbonyl group of the keto-acid should be positioned next to a terminal methyl group in order to obtain satisfactory yields. Prior applications, Serial Nos. 464,607 and 489,300, filed October 25, 1954, and February 18, 1955, respectively, disclose a number of illustrative compounds suitable for use as the Diphenolic Acid and methods of preparing the same. These materials, which are referred to for convenience as Diphenolic Acid or DPA, consist of the condensation products of levulinic acid and phenol, substituted phenols, or mixtures thereof. It is to be understood that the phenolic nuclei of the Diphenolic Acid may be substituted with any groups which will not interfere with the reactions contemplated herein. For example, the nuclei may be alkylated with alkyl groups of from 1–5 carbon atoms as disclosed in my copending application Serial No. 489,300 or they may be halogenated. The Diphenolic Acid derived from substituted phenols, such as the alkylated phenols, are sometimes more desirable than the products obtained from unsubstituted phenols since the alkyl groups provide better organic solvent solubility, flexibility, and water resistance. However, the unsubstituted product is usually more readily purified.

Polyhydric alcohols which may be used in the preparation of the mixed esters include both the resinous- and nonresinous-type alcohols. Illustrative of the nonresinous-type of polyhydric alcohols are such materials as ethylene glycol, polyethylene glycols, propylene glycol, polypropylene glycols, 1,4-butanediol, 2,5-pentanediol, 1,6-hexanediol, neopentyl glycol, glycerol, erythritol, pentaerythritol, polypentaerythritols, sorbitol, manitol, alphamethyl glucoside, polyallyl alcohols, diethanolamine, triethanolamine and tetramethylol cyclohexanol.

The resinous polyhydric alcohols which may be employed can be illustrated by such products as those prepared by the reaction of phenol-formaldehyde condensates with chlorohydrins. For example, an alkyl phenol may be condensed with formaldehyde to form an intermediate methylol derivative and an alkaline solution of this intermediate may then be treated with a chlorohydrin, such as glycerol monochlorohydrin, to yield after condensation a polymeric polyhydric alcohol. Still other resinous polyhydric alcohols may be illustrated by the alcoholic epoxide resins which are polyether derivatives of polyhydric phenols and such polyfunctional materials as polyhalohydrins, polyepoxides, or epihalohydrins. Reaction products may be prepared which are monomeric or polymeric polyhydric alcohols having aliphatic chains and aromatic nuclei connected to each other by ether linkages and containing terminal epoxide groups. Preparations of these epoxide materials, as well as some illustrative examples, are described in U.S. Patents 2,456,408, 2,503,726, 2,615,007, 2,615,008, 2,668,805, 2,668,807, and 2,698,315. Well-known commercial examples of these resins are the Epon resins marketed by the Shell Chemical Corporation.

The modifying organic acids employed with the hydroxyaryl substituted aliphatic acids in preparing the mixed esters used in this invention include a wide variety of aliphatic or aromatic, resinous or nonresinous, short- or long-chain, saturated or unsaturated materials. The selection of the modifying acid depends upon the characteristics which are desired in the final polymeric products of this invention.

Self-plasticized compositions, which in addition have air-drying characteristics, may be prepared by employing as the modifying organic acid the drying oil fatty acids. These acids normally contain from about 18 to 22 carbon atoms and are obtained by the saponification of naturally occurring unsaturated vegetable oils. Other acids may be illustrated by the fish oil acids and the shorter chained unsaturated acid, undecanoic acid which is a decomposition product of castor oil acids. Mixed esters prepared from these materials suitable for use in this invention are more fully described in a copending application of Greenlee, filed April 11, 1955, having Serial No. 500,696 entitled "Mixed Esters." Low molecular weight unsaturated acids may also be used if only air-drying or heat-converting characteristics are desired since the plasticization effect of the low molecular weight materials in insignificant. Examples of such acids are crotonic and sorbic acid.

The saturated monobasic aliphatic acids may also be used in the production of the mixed esters. Such acids offer a convenient means for regulating the plasticity of the resulting products. Examples of these acids are acetic, decanoic and stearic acid. In general, the longer chain acids, having more than about 10 carbon atoms, are the most effective plasticizers. The long-chain saturated acids may be obtained by saponification of the vegetable and fish oil acids, the unsaturated acids being first hydrogenated to remove their unsaturation. Longer chain saturated acids may be obtained by the saponification of naturally occurring waxes or by chemical synthesis using the so-called Oxo process.

Mixed esters prepared from resinous acids are advantageously employed in some instances. For example, rosin acids are generally used in the preparation of polymeric products to impart hardness, gloss, and other resinous characteristics. Mixed esters prepared from such materials as these rosin acids may be advantageously employed in this invention. The preparation of such mixed esters is more fully described in the copending application of Greenlee entitled "Mixed Resin Acid Esters," Serial No. 519,279, filed June 30, 1955. Aromatic acids also are valuable as the modifying organic acid and may be illustrated by such materials as benzoic acid, butyl benzoic acid, phthalic acid, naphthoic acid, and phenoxy acetic acids. These acids are useful in imparting hardness, rigidity, and toughness to the polymeric products derived therefrom. The modifying acids used in the preparation of the mixed esters also include the dibasic acids such as succinic acid, azelaic acid, sebacic acid, and longer chain acids such as the 36 carbon acids prepared by dimerizing unsaturated vegetable oil acids. In the preparation of the mixed esters from polyhydric alcohols, hydroxyaryl-substituted acids and modifying organic acids, the reactants may be used in varying proportions of wide ranges.

The ratio of acid to polyhydric alcohol may be adjusted so that substantially equivalent amounts of carboxyl and hydroxyl groups are present in the mixture. Such compositions have been found to be particularly valuable. However, it is recognized that the hydroxyl content of the mixture can be increased greatly so as to be substantially in excess of carboxyl groups, for example in the range of about 5:1. Although such products are of value, it is considered undesirable to increase this ratio since the effect of the DPA and modifying acid is thereby virtually lost.

Similarly, the ratio of hydroxyaryl-substituted acid to the modifying organic acid may be proportioned within relatively wide ranges. Remarkable products were obtained, for example, when the ratio of hydroxyaryl-substituted acid to modifying organic acid ranged from about 1:5 and 5:1. The particular ratio employed, of course, would depend upon the choice of modifying acid and the modifications desired in the reaction mixtures and polymeric materials prepared from the mixed esters.

The mixed esters of this invention are conveniently prepared by direct heating at temperatures of from 190–275° C. with provision for the continuous removal of water produced by the condensation. Since the Diphenolic Acid and many of the modifying organic acids, as well as the polyhydric alcohols, have relatively high boiling points, which are in most cases above 190° C., water may be removed by permitting it to volatilize during esterification. In the case of the preparation of the esters of more volatile organic acids, it is convenient to use the anhydrides or sometimes the acid chlorides. For example, the preparation of a mixed ester containing the acetate would conveniently be prepared by using acetic anhydride for the esterification. In the preparation of the higher esters where high temperature is used, removal of the water may be facilitated by continuously bubbling through the reaction mixture during esterification a stream of inert gas, such as carbon dioxide or nitrogen. It is also sometimes convenient to facilitate the water removal by carrying out the reaction in a vessel provided with a condenser attached thereto through a water trap. A sufficient amount of a volatile water-insoluble solvent is added in order to obtain reflux at the esterification temperature. The water is continually removed by azeotropic distillation, permitting the solvent to return to the reaction mixture after having dropped the water in the water trap.

The order of addition of the various ingredients, Diphenolic Acid, modifying organic acid, and polyhydric alcohol, to each other may be varied. It is sometimes advantageous to vary the order of reaction to obtain optimum results with a particular combination of ingredients used. In the art of high temperature esterification, it is often desirable to use certain esterification catalysts, and these may be used in the preparation of the subject mixed esters. Another variation in the method of preparing the mixed esters is that of using the simple esters to prepare the esters of the polyhydric alcohols by alcoholysis. For example, one might use methyl oleate in an alcoholysis reaction with glycerol to prepare the oleic ester of glycerol.

It will be obvious to those skilled in the art that a particular combination of physical properties may be obtained for the polymeric products of this invention by employing a mixture of polyhydric alcohols and/or a mixture of modifying acids. Thus, products which include various combinations of such reactants are also considered to be within the scope of the present invention.

Examples I through IX, inclusive, describe the preparation of mixed esters of Diphenolic Acid, modifying organic acids, and polyhydric alcohols. The reactions were carried out in a 3-necked flask provided with a mechanical agitator, thermometer, and a water trap attachment for the condenser. The removal of water formed during esterification was facilitated by the utilization of azeotropic distillation with a small amount of xylene, the xylene being sufficient to give refluxing at the temperature of esterification. The proportions given are expressed as parts by weight unless otherwise indicated. Acid value represents the number of milligrams of KOH required to neutralize a 1-gram sample. The acid values were determined by direct titration. Softening points were determined by Durrans' Mercury Method (Journal of Oil and Color Chemists' Association 12, 173–175 [1929]).

EXAMPLE I

A mixture of 143 parts of 4,4-bis(4-hydroxyphenyl)-pentanoic acid and 70 parts of soyabean oil fatty acids was heated to 230° C. at which point 38 parts of dipentaerythritol were added over a period of 10 minutes. The reaction mixture was held at 230–240° C. for a period of 5 hours, during the last 15-minutes of which time the pressure was reduced to about 20 millimeters. The resulting product amounting to 227 parts had an acid value of 2.8 and a softening point of 80° C.

EXAMPLE II

A mixture of 51 parts of glycerol, 140 parts of dehydrated castor oil acids and 286 parts of 4,4-bis(4-hydroxyphenyl)pentanoic acid was heated over a period of 30 minutes to 90° C. and to 240° C. over a period of another hour. The reaction mixture was held at 240–245° C. for a period of 4½ hours. The resulting product, amounting to 448 parts, had an acid value of 9.5 and a softening point of 65° C.

EXAMPLE III

A mixture of 278 parts of Epon resin 1004 and 224 parts of linseed oil acids was heated at 220–224° C. for a period of 1½ hours. To this mixture was added 57.2 parts of 4,4-bis(4-hydroxyphenyl)pentanoic acid and the heating continued at 230–240° C. for an additional 2½ hours. The resulting product had an acid value of 7 and a softening point of 63° C.

EXAMPLE IV

A mixture of 280 parts of dehydrated castor oil acids and 149 parts of pentaerythritol was heated to 235° C. and held at this temperature for a period of 1½ hours, at which point 797 parts of 4,4-bis(4-hydroxyphenyl)pentanoic acid was added and the heating continued at 210° C. for 6½ hours. The reaction mixture was finally heated to 240° C. over a period of ½ hour during which time the pressure was reduced to 20 millimeters. The resulting product amounted to 1130 parts and had an acid value of 7.6 and a softening point of 69° C.

EXAMPLE V

A mixture of 172 parts of 4,4-bis(4-hydroxyphenyl)pentanoic acid and 56 parts of linseed oil acids was heated to 220° C. at which point 30 parts of pentaerythritol were added slowly over a period of 12 minutes and the reaction continued at 215–225° C. for a period of 6 hours. The pressure was reduced to around 20 millimeters during the latter 18 minutes of the reaction period. The product, amounting to 232 parts had an acid value of 5 and a softening point of 79° C.

EXAMPLE VI

A mixture of 280 parts of China-wood oil acids and 150 parts of pentaerythritol was heated at 225° C. until the acid value had reached 6. To this mixture was added 850 parts of 4,4-bis(4-hydroxyphenyl)pentanoic acid and the reaction mixture heated for a period of 2 hours at 210–220° C. The pressure was reduced to 30 millimeters during the last 20 minutes of heating. The resulting product had a softening point of 95° C.

EXAMPLE VII

A mixture of 343 parts of 4,4-bis(4-hydroxyphenyl)pentanoic acid, 227 parts of stearic acid and 68 parts of glycerol was heated for a period of 1 hour at 203–220° C. and for a period of 4 hours at 220–248° C. to give a product having an acid value of 2.9.

EXAMPLE VIII

A mixture of 286 parts of 4,4-bis(4-hydroxyphenyl)pentanoic acid, 280 parts of soyabean oil acids and 68 parts of ethylene glycol was heated for a period of 40 minutes at 225° C. and for an additional period of 5 hours at 225–238° C. to give a product having an acid value of 9.5.

EXAMPLE IX

A mixture of 286 parts of 4,4-bis(4-hydroxyphenyl)pentanoic acid, 280 parts of China-wood oil acids and 68 parts of ethylene glycol was heated for a period of 6 hours at 220–237° C. to give a product having an acid value of 2.9.

Illustrative of the epoxide compositions which may be employed in this invention are the complex epoxide resins which are polyether derivatives of polyhydric phenols with such polyfunctional coupling agents as polyhalohydrins, polyepoxides, or epihalohydrins. These compositions may be described as polymeric polyhydric alcohols having alternating aliphatic chains and nuclei connected to each other by ether linkages, containing terminal epoxide groups and free from functional groups other than epoxide and hydroxyl groups. It should be understood that significant amounts of the monomeric reaction products are often present. This would be illustrated by I to III below where *n* equals zero. Preparation of these epoxide materials as well as illustrative examples are described in U.S. Patents 2,456,408, 2,503,726, 2,615,007, 2,615,008, 2,668,807, 2,688,805, and 2,698,315. Well-known commercial examples of these resins are the Epon resins marketed by the Shell Chemical Corporation. Illustrative of the preparation of these epoxide resins are the following reactions wherein the difunctional coupling agent is used in varying molar excessive amounts:

Polyhydric phenol and an epihalohydrin bis(hydroxyphenyl)isopropylidene + excess epichlorohydrin

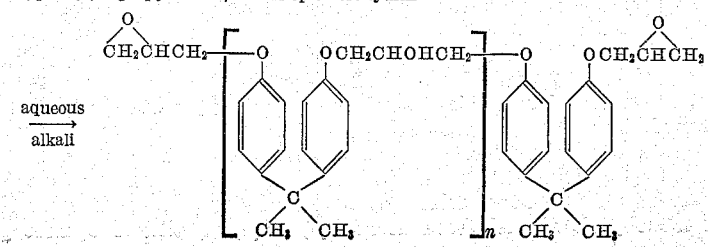

Polyhydric phenol and a polyepoxide bis(hydroxyphenyl)isopropylidene + excess butylene dioxide

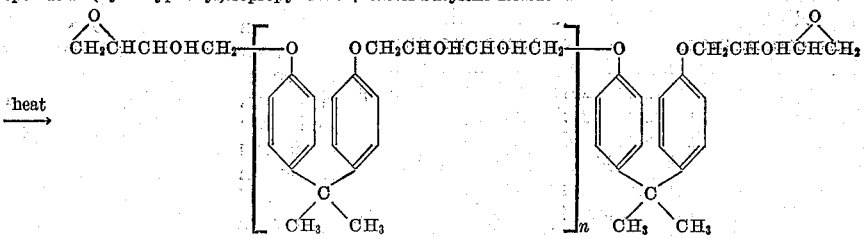

heat →

Polyhydric phenol and a polyhalohydrin bis(hydroxyphenyl)isopropylidene + excess alpha-glycerol dichlorohydrin

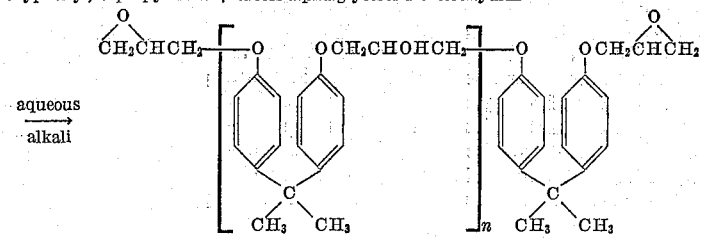

aqueous alkali →

As used in the above formulas, $n$ indicates the degree of polymerization depending on the molar ratio of reactants. As can be seen from these formulas, the complex epoxide resins used in this invention contain terminal epoxide groups and alcoholic hydroxyl groups attached to the aliphatic portions of the resin, the latter being formed by the splitting of epoxide groups in the reaction of the same with phenolic hydroxyl groups. Ultimately, the reaction with the phenolic hydroxyl groups of the polyhydric phenols is generally accomplished by means of epoxide groups formed from halohydrins by the loss of hydrogen and halogen as shown by the following equation:

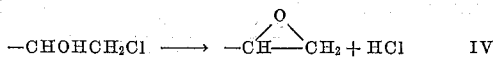

Other epoxide compositions which may be used include the polyepoxide polyesters which may be prepared by esterifying tetrahydrophthalic anhydride with a glycol and epoxidizing the product of the esterification reaction. In the preparation of the polyesters, tetrahydrophthalic acid may also be used as well as the simple esters of tetrahydrophthalic acid such as dimethyl and diethyl esters. There is a tendency with tertiary glycols for dehydration to occur under the conditions used for esterification so that generally the primary and secondary glycols are the most satisfactory in the polyester formation. Glycols which may be used in the preparation of this polyester composition comprise, in general, those glycols having two hydroxyl groups attached to separate carbon atoms and free from functional groups which would interfere with the esterification or epoxidation reactions. These glycols include such glycols as ethylene glycol, diethylene glycol, triethylene glycol, tetramethylene glycol, propylene glycol, polyethylene glycol, neopentyl glycol, and hexamethylene glycol. Polyepoxide polyesters may be prepared from these polyesters by epoxidizing the unsaturated portions of the tetrahydrophthalic acid residues in the polyester composition. By properly proportioning reactants in the polyester formation and regulating the epoxidation reaction, polyepoxides having up to 12 or more epoxide groups per molecule may be readily prepared. These polyepoxide polyester compositions, as well as their preparation, are more fully described in a copending application having Serial No. 503,323, filed April 22, 1955.

Polyepoxide compositions useful in this invention also include the epoxidized unsaturated natural oil acid esters, including the unsaturated vegetable, animal, and fish oil acid esters made by reacting these materials with various oxidizing agents. These unsaturated oil acid esters are long chain aliphatic acid esters containing from about 15 to 22 carbon atoms. These acids may be esterified by simple monohydric alcohols such as methyl, ethyl, or decyl alcohol, by polyhydric alcohols such as glycerol, pentaerythritol, polyallyl alcohol, or resinous polyhydric alcohols. Also suitable are the mixed esters of polycarboxylic acids and long chain unsaturated natural oil acids with polyhydric alcohols, such as glycerol and pentaerythritol. These epoxidized oil acid esters may contain from more than 1 up to 20 epoxide groups per molecule. The method of epoxidizing these unsaturated oil acid esters consists of treating them with various oxidizing agents, such as the organic peroxides and the peroxy acids, or with one of the various forms of hydrogen peroxide. A typical procedure practiced in the art consists of using hydrogen peroxide in the presence of an organic acid, such as acetic acid and a catalytic material, such as sulfuric acid. More recently epoxidation methods have consisted of replacing the mineral acid catalyst with a sulfonated cation exchange material, such as the sulfonated copolymer of styrene divinylbenzene.

The epoxide compositions which may be used in preparing the compositions of this invention also include the simple aliphatic polyepoxides which may be illustrated by the products obtained by polymerizing allyl glycidyl ether through its unsaturated portion.

The reaction may be carried to give higher polymers than the dimer. Other aliphatic polyepoxides useful in this invention may be illustrated by the poly(epoxyalkyl) ethers derived from polyhydric alcohols. These materials may, in general, be prepared by reacting an aliphatic polyhydric alcohol with an epihalohydrin in the presence of a suitable catalyst and in turn dehydrohalogenating the product to produce the epoxide composition. The production of these epoxides may be illustrated by the reaction of glycerol with epichlorohydrin in the presence of boron trifluoride followed by dehydrohalogenation with sodium aluminate as follows:

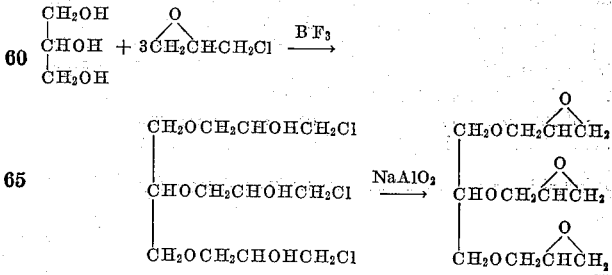

It is to be understood that such reactions do not give pure compounds and that the halohydrins formed and the epoxides derived therefrom are of somewhat varied character depending upon the particular reactants, their proportions, reaction time and temperature. In addition to epoxide groups, the epoxide compositions may be characterized by the presence of hydroxyl groups and halogens. Dehydrohalogenation affects only those hydroxyl groups and halogens which are attached to adjacent carbon atoms. Some halogens may not be removed in this step in the event that the proximate carbinol group has been destroyed by reaction with an epoxide group. These halogens are relatively unreactive and are not to be considered as functional groups in the conversion of the reaction mixtures of this invention. The preparation of a large number of these mixed polyepoxides is described in the Zech patents, U.S. 2,538,072, 2,581,464, and 2,712,000. Still other polyepoxides which have been found to be valuable are such epoxide compositions as diepoxy butane, diglycid ether, and epoxidized polybutadiene.

Immediately following is a description of preparations of polyepoxides which will be used to prepare the polymeric compositions of this invention.

The complex resinous polyepoxides used in the examples and illustrative of the commercially prepared products of this type are the Epon resins marketed by Shell Chemical Corporation. The following table gives the properties of some Epon resins which are prepared by the condensation in the presence of alkali of bis(4-hydroxyphenyl)isopropylidene with a molar excess of epichlorohydrin in varying amounts.

| Epon resin type | Melting point, °C. | Viscosity [1] (Gardner-Holdt) | Epoxide equivalent | Average molecular weight |
|---|---|---|---|---|
| Epon 864 | 40–45 | $A_1$–B | 325 | 450 |
| Epon 1001 | 64–76 | C–G | 480 | 640 |
| Epon 1004 | 95–105 | Q–U | 870 | 1,133 |
| Epon 1007 | 127–133 | Y–$Z_1$ | 1,750 | |

[1] Based on 40% nonvolatile in butyl carbitol at 25° C.

Examples X through XVI describe the preparation of typical polyepoxide polyesters.

EXAMPLE X

*Preparation of polyester from tetrahydrophthalic anhydride and ethylene glycol*

In a 3-necked flask provided with a thermometer, mechanical agitator, and a reflux condenser attached through a water trap was placed a mixture of 3 mols of tetrahydrophthalic anhydride and 2 mols of n-butanol. After melting the tetrahydrophthalic anhydride in the presence of the butanol, 2 mols of ethylene glycol were added. The reaction mixture was gradually heated with agitation to 225° C. at which point a sufficient amount of xylene was added to give refluxing at esterification temperature. The reaction mixture was then heated with continuous agitation at 225–235° C. until an acid value of 4.2 was obtained. This product gave an iodine value of 128.

*Epoxidation of the polyester resin*

In a 3-necked flask provided with a thermometer, a mechanical agitator, and a reflux condenser was placed 107 parts of the dehydrated acid form of a cation exchange resin (Dowex 50–X–8, 50–100 mesh, Dow Chemical Company, a sulfonated styrene-divinylbenzene copolymer containing about 8% divinylbenzene, the percent divinylbenzene serving to control the amount of crosslinkage. The Dowex resins are discussed in publications entitled "Ion Exchange Resins No. 1" and "Ion Exchange Resins No. 2," copyright 1954 by Dow Chemical Company, the publications having form number Sp32-254 and Sp31-354, respectively), and 30 parts glacial acetic acid. The mixture of cation exchange resin and acetic acid was allowed to stand until the resin had completely taken up the acid. To this mixture was added 200 parts of the polyester resin dissolved in an equal weight of xylene. To the continuously agitated reaction mixture was added dropwise over a period of 45 minutes to 1 hour, 75 parts of 50% hydrogen peroxide. The reaction temperature was held at 60° C. requiring the application of some external heat. (In some preparations involving other polyester resins, sufficient exothermic heat is produced during the addition of hydrogen peroxide so that no external heat is required, or even some external cooling may be required.) The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 42. The percent nonvolatile of this solution amounting to 400 parts was 50. This 400 parts of solution was thoroughly mixed with 110 parts of the dehydrated basic form of Dowex 1 (an anion exchange resin of the quaternary ammonium type. Dowex 1 is a styrene-divinylbenzene copolymer illustrated by the formula $$RR'_3N^+OH^-$$

where R represents the styrene-divinylbenzene matrix and R′ is a methyl group, manufactured by the Dow Chemical Company). The resulting mixture was then filtered followed by pressing as much of the solution as possible from the anion exchange resin cake. This product had an acid value of 4.5 and an epoxide equivalent of 288 based on a nonvolatile resin content of 42.0%. The epoxide values as discussed herein were determined by refluxing for 30 minutes a 2-gram sample with 50 milliliters of pyridine hydrochloride in excess pyridine. (The pyridine hydrochloride solution was prepared by adding 20 milliliters of concentrated HCl to a liter of pyridine.) After cooling to room temperature, the sample is then back-titrated with standard alcoholic sodium hydroxide.

EXAMPLE XI

Following the procedure of Example X a polyester resin was prepared from 5 mols of tetrahydrophthalic anhydride, 4 mols of diethylene glycol, and 2 mols of n-butanol. This product had an acid value of 5.3 and an iodine value of 107. This polyester resin was epoxidized in the manner previously described to give an epoxide equivalent weight of 371 on the nonvolatile content. The nonvolatile content of this resin solution as prepared was 40.2%.

EXAMPLE XII

The process of Example X was followed to obtain a polyester resin from 1.1 mols of tetrahydrophthalic anhydride, 1 mol of 1,4-butanediol, and 0.2 mol of n-butanol. The product had an acid value of 8.6. This polyester resin was epoxidized in the same manner to give an epoxide equivalent weight of 292 and an acid value of 5.2 on the nonvolatile content. The nonvolatile content of this resin solution was 41.9%.

Examples XIII and XIV describe the preparation of epoxidized vegetable oil acid esters.

EXAMPLE XIII

*Epoxidized soybean oil acid modified alkyd resin* a. *Preparation of alkyd resin.*—To a kettle provided with a condenser was added 290 parts of white refined soyabean oil. While bubbling a continuous stream of nitrogen through this oil the temperature was raised to 250° C., at which temperature 0.23 part of litharge was added and the temperature held at 250° C. for 5 minutes. While holding the temperature above 218° C., 68 parts of technical pentaerythritol were added after which the temperature was raised to 238° C. and held until a mixture of 1 part of the product and 2½ parts of methyl alcohol showed no insolubility (about 15 minutes). At this point 136 parts of phthalic anhydride were added and the temperature gradually raised to 250° C. and held at this temperature for 30 minutes. At this point the condenser was removed from the kettle and the pressure reduced somewhat by attaching to a water aspirator evacuating system. With continuous agitation the mixture was held at 250° C. until the acid value had reached 10.5. At this point the resin was thinned with xylene to a 48% nonvolatile content having a viscosity of H (Gardner bubble viscosimeter).

*b. Epoxidation of a soybean oil acid modified alkyd resin.*—In a 3-necked flask provided with a thermometer, a mechanical agitator and a reflux condenser was placed 70 parts of dehydrated acid form of a cation exchange resin (Dowex 50–X–8) and 15 parts of glacial acetic acid. The mixture of cation exchange resin and acetic acid was allowed to stand until the resin had completely taken up the acid. To this mixture was added 315 parts of the alkyd resin solution described in the above paragraph and 190 parts of xylene. To the continuously agitated reaction mixture was added dropwise 38 parts of 50% hydrogen peroxide. The reaction temperature was held at 60° C. until a milliliter sample of the reaction mixture analyzed less than one milliliter of 0.1 N sodium thiosulfate in an iodometric determination of hydrogen peroxide. The product was then filtered, finally pressing the cation exchange resin filter cake. The epoxide equivalent on the nonvolatile content was 475.

In order to remove the free acidity from the epoxidized product, 400 parts of the solution were thoroughly mixed with 110 parts of the dehydrated basic form of Dowex 1 (an amine type anion exchange resin). The resulting mixture was then filtered, followed by pressing as much of the solution as possible from the anion exchange resin cake.

EXAMPLE XIV

*Epoxidized soybean oil*

Admex 710, an epoxidized soyabean oil having an equivalent weight to an epoxide of 263, was dissolved in methyl ethyl ketone to a nonvolatile content of 50%. Admex 710, a product of the Archer-Daniels-Midland Company, has an acid value of 1, a viscosity of 3.3 stokes at 25° C. and an average molecular weight of 937.

Examples XV and XVI describe the preparation of simple aliphatic polyepoxides.

EXAMPLE XV

In a reaction vessel provided with a mechanical stirrer and external cooling means was placed 276 parts of glycerol and 828 parts of epichlorohydrin. To this reaction mixture was added 1 part of 45% boron trifluoride ether solution diluted with 9 parts of ether. The reaction mixture was agitated continuously. The temperature rose to 50° C. over a period of 1 hour and 45 minutes at which time external cooling with ice water was applied. The temperature was held between 50 and 75° C. for 1 hour and 20 minutes. To 370 parts of this product in a reaction vessel provided with a mechanical agitator and a reflux condenser was added 900 parts of dioxane and 300 parts of powdered sodium aluminate. With continuous agitation this reaction mixture was gradually heated to 92° C. over a period of 1 hour and 50 minutes, and held at this temperature for 8 hours and 50 minutes. After cooling to room temperature, an inorganic material was removed by filtration. The dioxane and low boiling products were removed by heating the filtrate to 205° C. at 20 mm. pressure to give a pale yellow product. The epoxide equivalent of this product was determined by treating a 1 gram sample with an excess of pyridine containing pyridine hydrochloride (made by adding 20 cc. of concentrated hydrochloric acid per liter of pyridine) at the boiling point for 20 minutes and back-titrating the excess pyridine hydrochloride with 0.1 N sodium hydroxide using phenolphthalein as indicator and considering one HCl as equivalent to one epoxide group. The epoxide equivalent on this product was found to be 152.

EXAMPLE XVI

In a 3-necked flask provided with a thermometer, a mechanical agitator, a reflux condenser and a dropping funnel was placed 402 parts of allyl glycidyl ether. With continuous agitation the temperature was raised to 160° C. at which time one part of a solution of methyl ethyl ketone peroxide dissolved in diethyl phthalate to a 60% content was added. The temperature was held at 160–165° C. for a period of 8 hours, adding one part of the methyl ethyl ketone peroxide solution each 5 minutes during this 8-hour period. After the reaction mixture had stood overnight, the volatile ingredients were removed by vacuum distillation. The distillation was started at 19 mm. pressure and a pot temperature of 26° C. and volatile material finally removed at a pressure of 3 mm. and a pot temperature of 50° C. The residual product had a molecular weight of 418 and equivalent weight to epoxide content of 198, the yield amounting to 250 parts.

The phenol-aldehyde condensates used in making the compositions herein described are those formed by the reaction of aldehydes and phenols which contain reactive phenolic hydroxyl groups. Phenol and formaldehyde react to form a variety of reaction products depending upon the proportions and conditions of reaction. These include products such as phenol alcohols, having both phenolic and alcoholic hydroxyl groups, and products of diphenolmethane type containing phenolic hydroxyl groups. The condensation of phenol and formaldehyde can be carried out with the use of acid or alkaline-condensing agents, and in some cases, by first combining the aldehyde with an alkali, such as ammonia to form hexamethylenetetramine, and reacting the latter with the phenol. The phenol-aldehyde resins at an initial or intermediate stage of reaction are intended to be included in the term phenol-aldehyde condensates as used herein.

In general, the phenol-aldehyde condensates should not have their condensation carried so far as to become insoluble and nonreactive. It is preferred in the preparation of the instant composition that they be used at an intermediate stage or at a stage of reaction such that they contain reactive phenolic hydroxyl groups or both phenolic and alcoholic hydroxyl groups. This is desirable in order to permit a proper blending of the phenol-aldehyde condensate with the polyepoxide and mixed ester for subsequent reaction therewith.

The phenol-aldehyde condensates may be derived from mononuclear phenols, polynuclear phenols, monohydric phenols, or polyhydric phenols. The critical requirement for the condensate is that it be compatible with the polyepoxides and mixed ester or with the two reactants in a solvent used as a reaction medium. The phenol-aldehyde condensate, which is essentially the polymethylol phenol rather than a polymer, may be used in the preparation of the products of this invention, or it may be used after further condensation, in which case some of the methylol groups are considered to have disappeared in the process of condensation. Various so-called phenolic resins which result from the reaction of phenols and aldehydes, and particularly from common phenols or cresols and formaldehyde, are available as commercial products, both of initial and intermediate character. Such products include resins which are readily soluble in common solvents or readily fusible so that they can be admixed with the epoxides and mixed esters and reacted therewith to form the products of this invention.

In selecting the phenol-aldehyde condensates, one may choose either the heat-converting or the permanently-fusible type. For example, the formaldehyde reaction products of such phenols as carbolic acid, resorcinol, and bis(4-hydroxyphenyl)isopropylidene readily convert to infusible, insoluble compositions on the application of heat. On the other hand, some of the para-alkylated phenols, as illustrated by p-tert-butylphenol, produce permanently fusible resins on the reaction with formaldehyde. Even though fusible condensates are employed, however, insoluble, infusible products result when they are heated in combination with the epoxides and the mixed esters herein described.

Examples XVII through XIX describe the preparation of phenol-aldehyde condensates which are used in combination with the polyepoxides and mixed esters.

EXAMPLE XVII

*Condensation of Bisphenol [bis(para-hydroxyphenyl)isopropylidene] with formaldehyde*

In a 3-liter 3-necked flask provided with a mechanical agitator, a thermometer, and a reflux condenser was placed 912 parts of Bisphenol A, 960 parts of 37% aqueous formaldehyde, and 2.3 parts of oxalic acid. With continuous agitation the reaction mixture was heated to the reflux temperature and refluxing continued for a period of 1 hour. After permitting the reaction mixture to cool to around 50° C., the water layer was removed by decantation. The phenol-formaldehyde layer was then washed three times with water, which in each case was removed by decantation. The last portion of water was removed by distillation at reduced pressure using a water aspirator system which gave pressure around 30–40 mm. The temperature during the removal of this last portion of water ranged from 70–90° C. The product, amounting to 1065 parts, was a clear, heavy, syrupy material.

EXAMPLE XVIII

*Reaction of p-tertiary butylphenol with formaldehyde*

The procedure of preparation, including the dehydration step, was the same as that used in Example XVII. A mixture of 1000 parts of p-tert-butylphenol, 1067 parts of 37% aqueous formaldehyde, and 10 parts of sodium hydroxide was used to give a final yield of 1470 parts of a clear, almost colorless syrupy product.

EXAMPLE XIX

Again a reaction procedure, including the dehydration step, was the same as that used in Example XVII. A mixture of 658 parts of phenol, 1400 parts of 37% aqueous formaldehyde, and 6.6 parts of sodium hydroxide was used to give a yield of 1168 parts of a clear, syrupy product.

The polymeric reaction product of epoxides, phenol-aldehyde condensates, and mixed esters is effected by heating a mixture of the same at elevated temperatures, usually in the range of about 100–200° C., the addition of a catalyst ordinarily being unnecessary. However, in some cases it may be desirable to use small amounts of catalyst, such as the boron trifluoride adducts, sodium phenoxides, and sodium alcoholates, as well as the sodium salts of phenol-aldehyde condensates.

The mixture of epoxides, phenol-aldehyde condensates, and mixed esters is of utility at initial or varying intermediate stages of reaction. Thus initial or intermediate reaction products which are soluble in common solvents may be blended in solution in proper concentration and the solution then used as a coating or impregnant for fabrics or paper or for the formation of protective coating films. Heat may be then applied to remove the solvent and bring about polymerization to the insoluble, infusible state. In certain other instances, as for molding compositions, the initial mixture or intermediate reaction product of the three reactants described may be used without a solvent, giving directly a composite which, on the application of heat, converts to a final infusible product.

The reaction mixtures and final reaction products of this invention may be prepared by using varying proportions of mixed ester, epoxide, and phenol-aldehyde condensate. For instance, if relatively flexible final conversion products are desired, they may be advantageously prepared by using an excess of a relatively soft linear epoxide with lesser amounts of a relatively hard aldehyde condensate or by employing an excess of a predominantly linear soft aldehyde condensate with lesser amounts of the harder complex epoxide resins. Conversely, a harder conversion product could be prepared by using an excess of a relatively hard complex epoxide resin with lesser amounts of the softer aldehyde condensate or by using an excess of relatively hard aldehyde condensates with lesser amounts of the softer linear epoxide resins. Similarly, the amounts of mixed ester used may be adjusted to produce variations in hardness of the final conversion products.

It is apparent, therefore, that a wide range of proportions of the reactants are operable in the herein described compositions depending largely on the desired characteristics of the final product. For example, if an alkali-sensitive coating is desired, a slight excess of acid could be used in preparing the mixed ester, or for certain other applications, it may be desirable to use a larger amount of polyepoxide to increase the chemical resistance. In still other instances, flexibility may be increased in a given composition by employing a mixed ester which contains a relatively large amount of a long chain organic acid. Alternatively, flexibility, as well as toughness, may be imparted by larger amounts of a predominantly linear phenol-aldehyde condensate, such as the condensate prepared from p-tert-butylphenol and formaldehyde. In general, while a large excess of the polyepoxide or mixed ester may be applicable for specific applications, most often equivalent or near equivalent ratios of polyepoxide and mixed ester are employed. The 2:1 to 1:2 ratios have been found to give the best overall characteristics and are therefore preferred, although ratios as high as 1:8 and 8:1 may be used. Equivalents as expressed refer to the weight of the polyepoxide per epoxide group, in the instance of the polyepoxides, and the weight of the ester per hydroxyl group, in the instance of the mixed ester. The phenol-aldehyde condensates are employed to make up from 5–85% of the composition by weight, but it is usually sufficient to use about 10% on a weight basis.

For the preparation of a composition such as a semi-liquid adhesive, it is advantageous to use syrupy phenol-aldehyde condensates, which are essentially uncondensed methylol phenols, a relatively low melting polyepoxide and a mixed ester having a softening point (Durrans' Mercury Method) below about 100° C. For various applications where solid or very viscous compositions are desired, partially polymerized mixtures could be advantageously used.

In making the new composition and products herein described, the polyepoxides, phenol-aldehyde condensates, and mixed esters may be used in regulated proportions without the addition of other materials. However, other constituents can be admixed with the new compositions, such as filling and compounding materials, plasticizers, pigments, etc. For compositions which tend to give somewhat brittle products on heat conversion to the insoluble, infusible state, plasticizers may be added. However, in most instances, it is possible to regulate the proportions of the three reacting ingredients so as to obtain products of suitable flexibility, obviating the necessity for plasticizers. The method of blending the added materials is dependent upon the nature of the materials, such as their softening point and their solubility in common solvents.

The present invention provides a wide range of reaction compositions and products, including initial mixtures of the aforesaid epoxides, phenol-aldehyde condensates and mixed esters, their partial or intermediate reaction products, and compositions containing such intermediate reaction products as well as final reaction products. In general, the initial mixtures, as well as the intermediate reaction products, unless too highly polymerized, are soluble in organic solvents used in lacquers, such as ketone and ester solvents.

In addition to having outstanding physical properties, such as hardness, toughness, and flexibility, the final infusible, insoluble products have outstanding chemical properties, such as high resistance to oxidation, water, alkali, acids, and organic solvents. It has been observed that the final conversion products possess unusually good adhesion to most surfaces, including metal, glass, wood, and plastics. It is this physical property of outstanding adhesion to a wide variety of surfaces which gives the subject products high potential value for use in formulating adhesives. The superior adhesion to surfaces is also of extreme value in formulating protective coating films for use on many types of surfaces. The adhesion characteristics are probably due to the fact that even in the converted, infusible state, the compositions contain a high percentage of highly polar groups, such as alcoholic hydroxyl groups, ether groups, and phenolic hydroxyl groups. Despite the high percentage of polar groups in the insoluble, infusible products of this invention, tolerance for water is unusually low, apparently due to the high molecular weight and the rigid crosslinked structure of the final composition.

The polymerization of mixtures of epoxide, phenol-aldehyde condensate, and mixed esters may involve several chemical reactions. It will be appreciated that such reactions are very complex and the extent to which each takes place will vary with the temperature, the time of heat treatment, and with the nature of the three reactants employed. While it is not intended to be limited by any theoretical explanation of the exact nature of these reactions, it seems probable that conversion to the final polymeric products, by reaction between the three reactants described, involves direct polymerization of the epoxide groups inter se, phenol-aldehyde condensation and reaction of epoxide groups with active hydrogen-containing groups such as methylol hydroxyl groups and phenolic hydroxyl groups, all of which take place to some extent simultaneously in forming the final products.

Examples XX through LXXVIII, inclusive, illustrate the conversion of combinations of the polyepoxides, phenol-aldehyde condensates, and mixed esters to insoluble protective coating films. For these preparations, the polyepoxides, phenol-aldehyde condensates, and mixed esters were cut in a suitable solvent, the percent nonvolatile being 40–60%. The complex polyepoxides and simple aliphatic polyepoxides were dissolved in methyl ethyl ketone, while the epoxidized polyesters and epoxidized natural oils were dissolved in xylene. The mixed esters were dissolved in methyl ethyl ketone, and the phenol-aldehyde condensates were cut in a mixture of butanol and methyl ethyl ketone. The solutions of the polyepoxides, phenol-aldehyde condensates, and mixed esters were admixed and spread on panels in thin films of .002" wet thickness and baked for periods of 30–90 minutes at 175–200° C. Proportions hereinafter expressed refer to parts by weight and are based on the nonvolatile content of the solution of reactants.

| Example No. | Parts of polyepoxide | Parts of mixed ester | Parts of aldehyde condensate | Baking schedule, min./° C. | Films resistance | |
|---|---|---|---|---|---|---|
| | | | | | Boiling water | 5% aqueous NaOH at 25° C. |
| XX | 10.5 Epon 1001 | 5.0 Ex. I | 1.6 Ex. XIX | 30/175 | 1 hr | 168 hrs. |
| XXI | 19.3 Epon 1004 | 5.0 Ex. I | 2.4 Ex. XIX | 30/175 | 7 hrs. 30 min | 110 hrs. |
| XXII | 7.3 Epon 864 | 5.0 Ex. I | 2.5 Ex. XIX | 30/175 | 10 min | 168 hrs. |
| XXIII | 22.4 Epon 1004 | 5.0 Ex. IV | 2.7 Ex. XVIII | 30/175 | 7 hrs. 20 min | 168 hrs. |
| XXIV | 20.0 Epon 1007 | 2.5 Ex. II | 2.3 Ex. XVIII | 30/175 | 7 hrs. 20 min | 168 hrs. |
| XXV | 7.6 Epon 864 | 5.0 Ex. II | 1.3 Ex. XVIII | 30/175 | 10 min | 168 hrs. |
| XXVI | 10.9 Epon 1001 | 5.0 Ex. II | 1.6 Ex. XVII | 60/175 | 3 hrs | 168 hrs. |
| XXVII | 6.3 Epon 1007 | 5.0 Ex. III | 1.1 Ex. XVII | 60/175 | 3 hrs | 168 hrs. |
| XXVIII | 1.2 Epon 864 | 5.0 Ex. III | 0.6 Ex. XVII | 60/175 | 5 hrs | 168 hrs. |
| XXIX | 9.8 Epon 1001 | 5.0 Ex. VII | 1.5 Ex. XVII | 30/175, 30/200 | 8 hrs | 168 hrs. |
| XXX | 22.9 Epon 1004 | 5.0 Ex. VI | 2.8 Ex. XVII | 30/175 | 10 min | 168 hrs. |
| XXXI | 15.1 Epon 1004 | 5.0 Ex. IX | 2.0 Ex. XVII | 30/175, 30/200 | 8 hrs | 168 hrs. |
| XXXII | 22.2 Epon 1007 | 5.0 Ex. V | 2.7 Ex. XVIII | 30/175 | 8 hrs | 168 hrs. |
| XXXIII | 5.7 Epon 864 | 5.0 Ex. VIII | 1.1 Ex. XVIII | 30/175 | 10 min | 8 hrs. |
| XXXIV | 1.5 Epon 864 | 0.5 Ex. IX | 8.0 Ex. XVIII | 30/200 | 20 min | 168 hrs. |
| XXXV | 3.0 Epon 864 | 2.0 Ex. V | 5.0 Ex. XVIII | 30/200 | | 4 hrs. |
| XXXVI | 7.5 Ex. XI | 5.0 Ex. II | 1.3 Ex. XIX | 30/175 | 7 hrs. 20 min | 10 min. |
| XXXVII | 6.3 Ex. XII | 5.0 Ex. I | 1.1 Ex. XIX | 30/175 | 20 min | 15 min. |
| XXXVIII | 0.9 Ex. X | 5.0 Ex. III | 1.6 Ex. XVIII | 60/175 | 1 hr. 35 min | 168 hrs. |
| XXXIX | 6.6 Ex. XII | 5.0 Ex. II | 1.2 Ex. XIX | 45/175 | 7 hrs. 20 min | 10 min. |
| XL | 1.2 Ex. XI | 5.0 Ex. III | 0.6 Ex. XVII | 30/175 | 5 hrs. 30 min | 40 min. |
| XLI | 7.3 Ex. XI | 5.0 Ex. IV | 1.2 Ex. XVII | 90/175 | 7 hrs. 20 min | 10 min. |
| XLII | 8.3 Ex. XI | 5.0 Ex. V | 1.3 Ex. XVIII | 30/175 | 4 hrs | <5 min. |
| XLIII | 7.5 Ex. XI | 5.0 Ex. VI | 1.3 Ex. XVIII | 30/175 | 1 hr. 20 min | 2 hrs. 15 min. |
| XLIV | 5.2 Ex. X | 5.0 Ex. VII | 1.0 Ex. XVIII | 90/200 | 3 hrs | 32 hrs. |
| XLV | 4.9 Ex. XII | 5.0 Ex. VIII | 1.0 Ex. XVII | 30/175, 30/200 | 5 hrs | 10 min. |
| XLVI | 4.9 Ex. XII | 5.0 Ex. IX | 1.0 Ex. XVII | 30/200 | 8 hrs | 5 min. |
| XLVII | 8.0 Ex. XI | 1.0 Ex. VI | 1.0 Ex. XVIII | 30/200 | 1 hr. 30 min | 2 hrs. 10 min. |
| XLVIII | 1.5 Ex. XI | 0.5 Ex. VI | 8.0 Ex. XVIII | 30/200 | 7 hrs. 30 min | |
| XLIX | 3.0 Ex. X | 2.0 Ex. VI | 5.0 Ex. XVIII | 30/200 | 20 min | 4 hrs. |
| L | 10.8 Ex. XIII | 5.0 Ex. I | 1.6 Ex. XIX | 30/175 | 10 min | 45 min. |
| LI | 10.8 Ex. XIII | 5.0 Ex. I | 1.6 Ex. XVIII | 60/175 | 1 hr. 8 min | 10 min. |
| LII | 1.8 Ex. XIII | 5.0 Ex. III | 0.7 Ex. XVII | 30/175 | 2 hrs. 45 min | 2 hrs. 30 min. |
| LIII | 5.7 Ex. XIV | 5.0 Ex. I | 1.1 Ex. XVIII | 30/200 | 1 hr. 25 min | 10 min. |
| LIV | 5.9 Ex. XIV | 5.0 Ex. II | 1.1 Ex. XVII | 60/200 | 7 hrs. 20 min | 10 min. |
| LV | 12.4 Ex. XIII | 5.0 Ex. IV | 1.7 Ex. XVII | 40/200 | 8 hrs | 15 min. |
| LVI | 6.6 Ex. XIV | 5.0 Ex. V | 1.6 Ex. XVII | 120/200 | 8 hrs | 5 min. |
| LVII | 6.8 Ex. XIV | 5.0 Ex. VI | 0.9 Ex. XVII | 40/200 | 8 hrs | 5 min. |
| LVIII | 10.0 Ex. XIII | 5.0 Ex. VII | 2.1 Ex. XVIII | 40/200 | 4 hrs. 30 min | 10 min. |
| LIX | 8.4 Ex. XIII | 5.0 Ex. VIII | 1.8 Ex. XVIII | 40/200 | 3 hrs. 30 min | 15 min. |
| LX | 8.4 Ex. XIII | 5.0 Ex. IX | 1.8 Ex. XVIII | 40/200 | 8 hrs | 35 min. |
| LXI | 1.0 Ex. XIV | 8.0 Ex. III | 1.0 Ex. XVII | 30/200 | 4 hrs | 168 hrs. |
| LXII | 2.5 Ex. XIV | 2.5 Ex. IX | 5.0 Ex. XVIII | 30/200 | 20 min | 2 hrs. |
| LXIII | 1.0 Ex. XIV | 1.0 Ex. VI | 8.0 Ex. XVIII | 30/200 | | 45 min. |
| LXIV | 6.6 Ex. XV | 10.0 Ex. I | 1.7 Ex. XVII | 30/175 | 2 hrs. 20 min | 1 hr. 15 min. |
| LXV | 8.7 Ex. XVI | 10.0 Ex. I | 1.9 Ex. XVII | 30/175 | 2 hrs. 15 min | 8 hrs. |
| LXVI | 6.8 Ex. XV | 10.0 Ex. II | 1.7 Ex. XVIII | 30/175 | 7 hrs. 20 min | 4 hrs. |
| LXVII | 9.1 Ex. XVI | 10.0 Ex. II | 1.9 Ex. XVIII | 30/175 | 5 hrs | 72 hrs. |
| LXVIII | 1.1 Ex. XV | 10.0 Ex. III | 1.1 Ex. XIX | 30/175 | 2 hrs. 45 min | 168 hrs. |
| LXIX | 1.4 Ex. XVI | 10.0 Ex. III | 1.1 Ex. XIX | 30/175 | 2 hrs. 45 min | 72 hrs. |
| LXX | 5.1 Ex. XV | 10.0 Ex. VIII | 1.8 Ex. XVIII | 45/175 | 10 min | 2 hrs. 15 min. |
| LXXI | 7.0 Ex. XVI | 10.0 Ex. IX | 1.9 Ex. XVIII | 45/175 | 3 hrs | 168 hrs. |
| LXXII | 8.1 Ex. XVI | 10.0 Ex. VII | 1.6 Ex. XVIII | 45/175 | 25 min | 8 hrs. |
| LXXIII | 7.6 Ex. XV | 10.0 Ex. IV | 1.8 Ex. XIX | 45/175 | 8 hrs | 8 hrs. |
| LXXIV | 7.6 Ex. XV | 10.0 Ex. V | 1.8 Ex. XIX | 45/175 | 8 hrs | 5 hrs. |
| LXXV | 10.3 Ex. XVI | 10.0 Ex. VI | 1.8 Ex. XIX | 45/175 | 8 hrs | 8 hrs. |
| LXXVI | 1.0 Ex. XV | 1.0 Ex. IX | 8.0 Ex. XVIII | 30/200 | | 4 hrs. |
| LXXVII | 8.0 Ex. XVI | 1.5 Ex. VI | 0.5 Ex. XVII | 30/200 | 8 hrs | 2 hrs. 10 min. |
| LXXVIII | 2.5 Ex. XV | 2.5 Ex. IX | 5.0 Ex. XVIII | 30/200 | 45 min | 168 hrs. |

It should be appreciated that while there are above disclosed but a limited number of embodiments of this invention, it is possible to produce still other embodiments without departing from the inventive concept herein disclosed.

It is claimed and desired to secure by Letters Patent:

1. A new composition of matter comprising the insoluble condensation product obtained by heating (A) an ester of a fusible polyhydric alcohol and a mixture of (1) a pentanoic acid consisting essentially of 4,4-bis(4-hydroxyaryl)pentanoic acid wherein the hydroxyaryl radical is a hydroxyphenyl radical and is free from substituents other than alkyl groups of from 1-5 carbon atoms and (2) at least one unsubstituted aliphatic hydrocarbon monocarboxylic acid having from about 10 to about 36 carbon atoms, (B) a polyepoxide containing an average of more than one oxirane group per molecule wherein said polyepoxide is composed of the elements carbon, hydrogen and oxygen and having oxygen present only in the groups selected from the group consisting of —OH, —COO—, ethereal oxygen and oxirane groups, and (C) a fusible phenol aldehyde condensation resin.

2. The composition of matter as described in claim 1 wherein the pentanoic acid of (A) consists essentially of 4,4-bis(4-hydroxyaryl)pentanoic acid wherein the hydroxyaryl radical is a hydroxyphenyl radical and is free from substituents other than alkyl groups of one carbon atom.

3. The composition of matter as described in claim 1 wherein the pentanoic acid of (A) is 4,4-bis(4-hydroxyphenyl)pentanoic acid.

4. The composition of claim 3 wherein the aliphatic hydrocarbon monocarboxylic acid of (A-2) is at least one unsaturated aliphatic hydrocarbon monocarboxylic acid having from about 10 to about 36 carbon atoms.

5. The composition of matter of claim 3 wherein (B) is a polyglycidyl ether of a member of the group consisting of polyhydric phenols and polyhydric alcohols.

6. The composition of matter as described in claim 3 wherein (B) is a polyepoxide polyester of tetrahydrophthalic acid and a glycol wherein the epoxy oxygen bridges adjacent carbon atoms on the tetrahydrophthalic acid residue.

7. The composition of matter as described in claim 3 wherein (B) is an aliphatic polyepoxide, said polyepoxide having only hydroxyl groups in addition to oxirane groups.

8. The composition of matter of claim 3 wherein (B) is an epoxidized acid from the group consisting of vegetable oil acid and fish oil acid.

9. The composition of matter of claim 3 wherein (C) is a hydroxybenzene-formaldehyde condensation resin.

10. The composition of matter of claim 3 wherein (C) is a p-tert-butylphenol-formaldehyde condensation resin.

11. The composition of matter of claim 3 wherein (C) is a bis-(p-hydroxyphenyl)isopropylidene-formaldehyde condensation resin.

No references cited.